US 9,386,364 B2

(12) United States Patent
Aihara

(10) Patent No.: US 9,386,364 B2
(45) Date of Patent: Jul. 5, 2016

(54) WATERPROOF MICROPHONE DEVICE

(71) Applicant: Panasonic Corporation, Osaka (JP)

(72) Inventor: Masayuki Aihara, Osaka (JP)

(73) Assignee: Panansonic Intellectual Property Management Co., Ltd., Osaka (JP)

( * ) Notice: Subject to any disclaimer, the term of this patent is extended or adjusted under 35 U.S.C. 154(b) by 197 days.

(21) Appl. No.: 14/140,543

(22) Filed: Dec. 26, 2013

(65) Prior Publication Data

US 2014/0185853 A1    Jul. 3, 2014

(30) Foreign Application Priority Data

Dec. 27, 2012    (JP) .................................. 2012-285508

(51) Int. Cl.
*H04R 1/08* (2006.01)
*G03B 17/08* (2006.01)
*G03B 31/00* (2006.01)

(52) U.S. Cl.
CPC ............... *H04R 1/086* (2013.01); *G03B 17/08* (2013.01); *G03B 31/00* (2013.01); *H04R 2499/11* (2013.01)

(58) Field of Classification Search
None
See application file for complete search history.

(56) References Cited

U.S. PATENT DOCUMENTS

| 2009/0052715 | A1* | 2/2009 | Zhang | H04R 1/406 381/365 |
| 2009/0213557 | A1* | 8/2009 | Wen | H04R 1/406 361/748 |
| 2012/0188690 | A1* | 7/2012 | Aihara | G03B 17/08 361/679.01 |
| 2012/0195451 | A1 | 8/2012 | Nakata et al. | |
| 2013/0063004 | A1* | 3/2013 | Lai | G06F 1/1688 312/223.1 |
| 2013/0223656 | A1* | 8/2013 | Iuchi | H04R 1/023 381/189 |

FOREIGN PATENT DOCUMENTS

| JP | 2001-298784 | 10/2001 |
| JP | 2005184422 A * | 7/2005 |
| JP | 2008-182474 | 8/2008 |
| JP | 2012-160897 | 8/2012 |

OTHER PUBLICATIONS

English machine translation of JP 2005-184422 (Izeki et al., Waterproof-Structured Microphone, published Jul. 2005).*

* cited by examiner

*Primary Examiner* — Wayne Young
*Assistant Examiner* — Mark Fischer
(74) *Attorney, Agent, or Firm* — PIPM

(57) ABSTRACT

This waterproof microphone device includes a plurality of microphones, a housing, and a plurality of air-impermeable cover members. The plurality of microphones pick up sound wave and output an audio signal. The housing individually houses the plurality of microphones. The housing includes a plurality of holes. The hole guides sound wave to the microphone. The plurality of air-impermeable cover members are mounted on the housing. The air-impermeable cover member seals off the hole.

11 Claims, 9 Drawing Sheets

WATERPROOF MICROPHONE DEVICE

CROSS-REFERENCE TO RELATED APPLICATIONS

This application claims priority under 35 U.S.C. §119 to Japanese Patent Application No. 2012-285508, filed on Dec. 27, 2012. The entire disclosure of Japanese Patent Application No. 2012-285508 is hereby incorporated herein by reference.

BACKGROUND

1. Technical Field

The technology disclosed herein relates to a waterproof microphone device.

2. Background Information

Some digital cameras produced in recent years come with a waterproof microphone device (see Japanese Laid-Open Patent Application 2012-160897). This waterproof microphone device has a waterproof cover member (waterproof sheet) to keep water from getting into the microphone. This waterproof cover member has a structure that prevents water from coming in from the outside toward the microphones. Also, this waterproof cover member has a structure that allows air from the outside to flow toward the microphone, and allows air to flow from the microphone side toward the outside (air-permeable structure).

SUMMARY

With a conventional waterproof microphone device, because the waterproof cover member had an air-permeable structure, there was the risk that sound wave passed through the waterproof cover member would interfere with sound wave produced by vibration of the waterproof cover member. Consequently, there was the risk that the phase of sound wave picked up by the microphone would collapse. That is, reproducing a stereo effect properly was difficult.

In view of the above problems, as well as other concerns, the present disclosure concerns a waterproof microphone device which can ensure good waterproof performance while allowing a stereo effect to be reproduced well.

The waterproof microphone device disclosed herein comprises a plurality of microphones, a housing, and a plurality of air-impermeable cover members. The plurality of microphones is configured to pick up sound wave and output an audio signal. The housing is configured to individually house the plurality of microphones. The housing includes a plurality of holes. The hole configured to guide sound wave to the microphone. The plurality of air-impermeable cover members are mounted on the housing. The air-impermeable cover member is configured to seal off the hole.

With the waterproof microphone device disclosed herein, waterproof performance can be ensured and a stereo effect can be reproduced well.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

An embodiment will now be described through reference to the drawings. In the following discussion of the drawings, portions that are the same or similar will be given the same or similar numbers. The drawings are merely schematics, however, and the dimensional proportions and so forth may be different from those in actuality. Therefore, specific dimensions and the like should be determined by referring to the following description. Also, dimensional relations and proportions may of course vary from one drawing to the next.

In the following embodiment, a digital camera will be described as an example of an imaging device. In the following description, assuming that the digital camera is in its normal orientation (hereinafter also referred to as landscape orientation), the direction facing the subject will be referred to as "forward," the direction facing away from the subject as "rearward," vertically upward as "upward," vertically downward as "downward," to the right in a state of facing directly at the subject as "to the right," and to the left in a state of facing directly at the subject as "to the left."

<Overall Configuration of Digital Camera>

Figure 1:
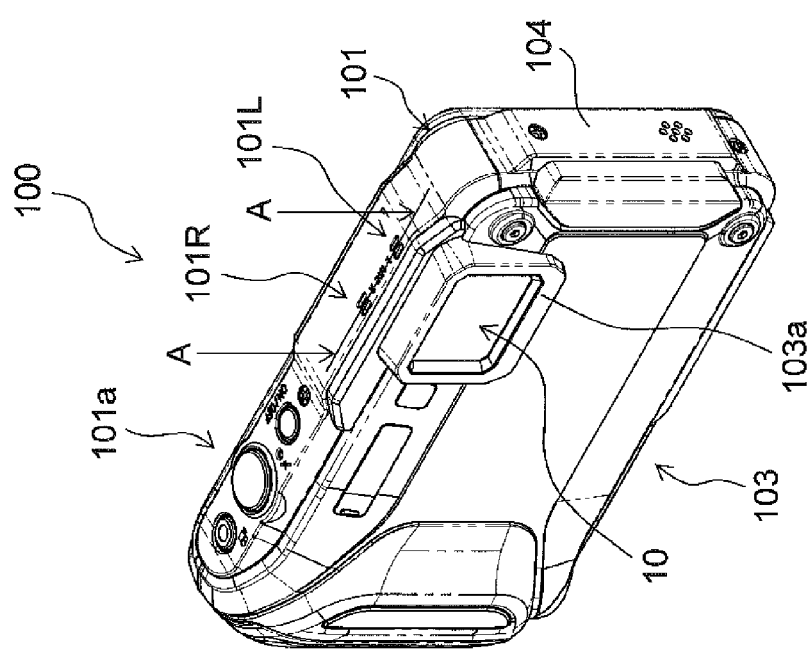
FIG. 1 is an oblique view of the digital camera pertaining to an embodiment as seen from the front.
Figure 2:
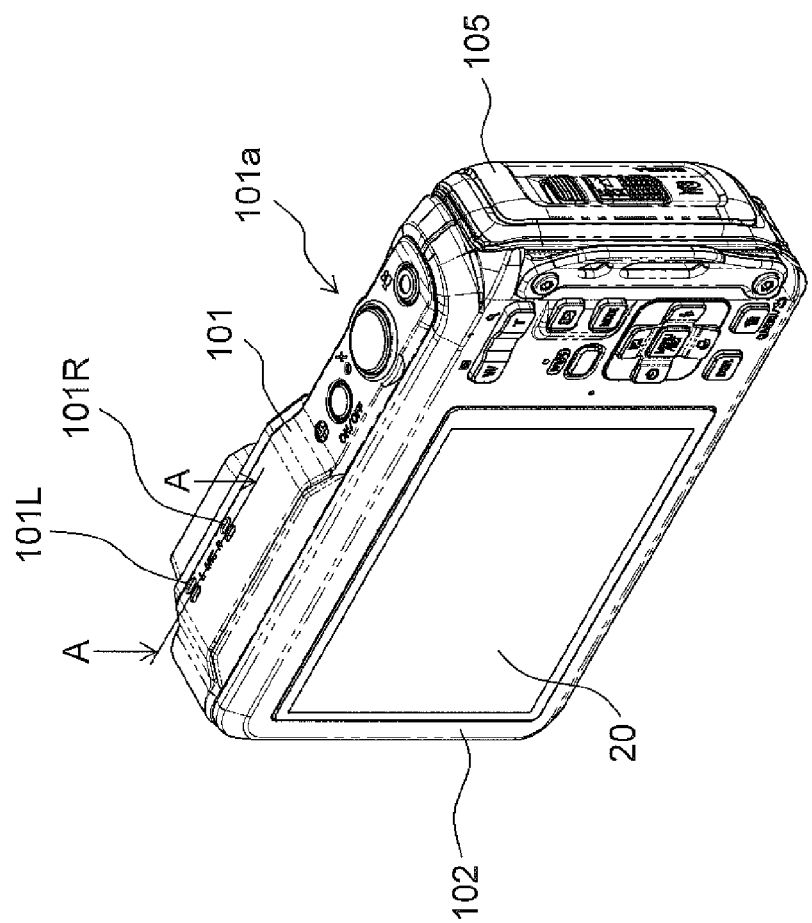
FIG. 2 is an oblique view of the digital camera pertaining to this embodiment as seen from the rear.
Figure 3A:
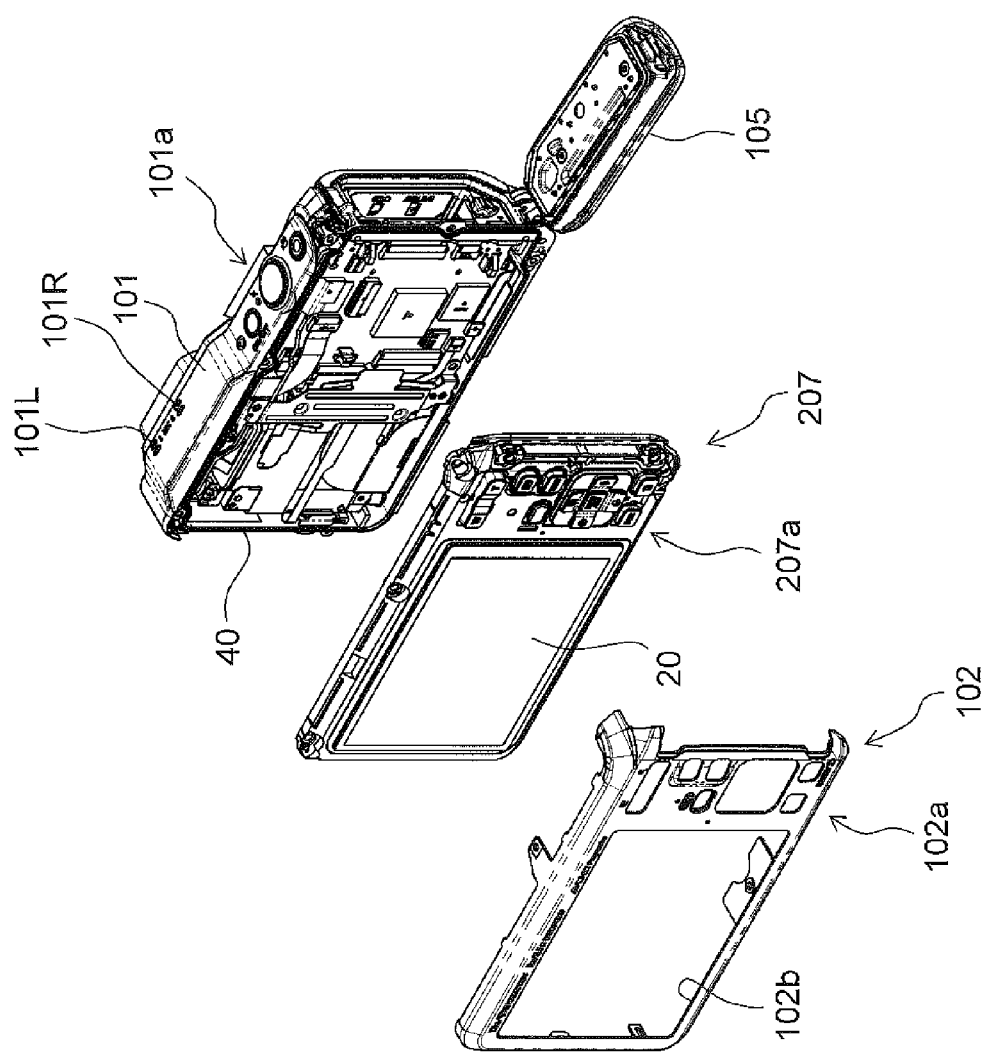
FIG. 3A is an exploded oblique view of the rear face of the digital camera pertaining to this embodiment.
Figure 3B:
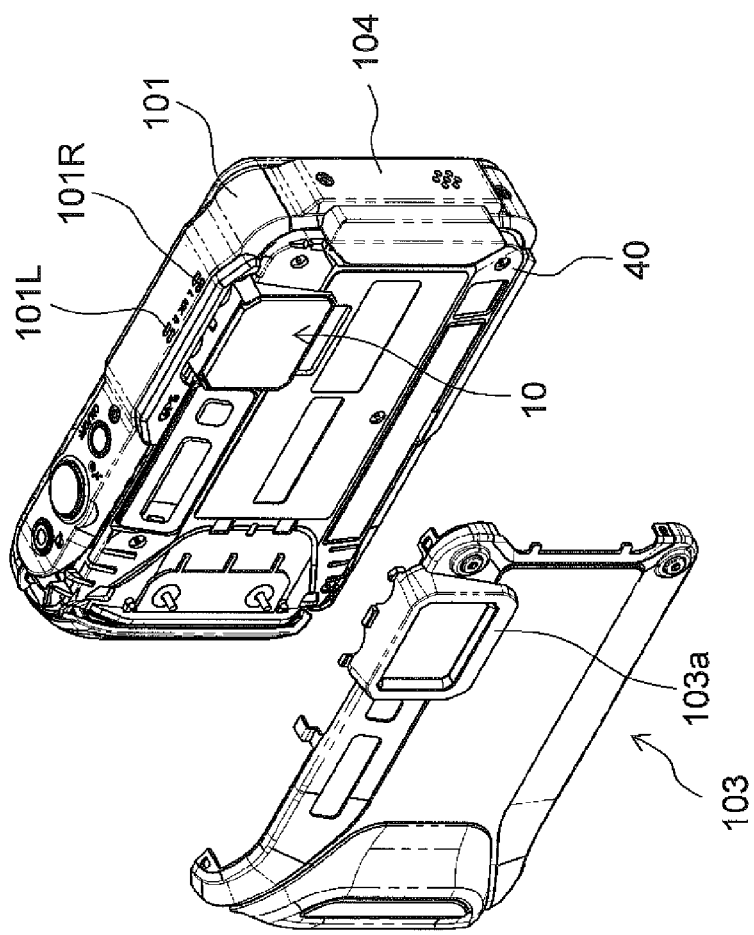
FIG. 3B is an exploded oblique view of the front face of the digital camera pertaining to this embodiment.
Figure 3C:
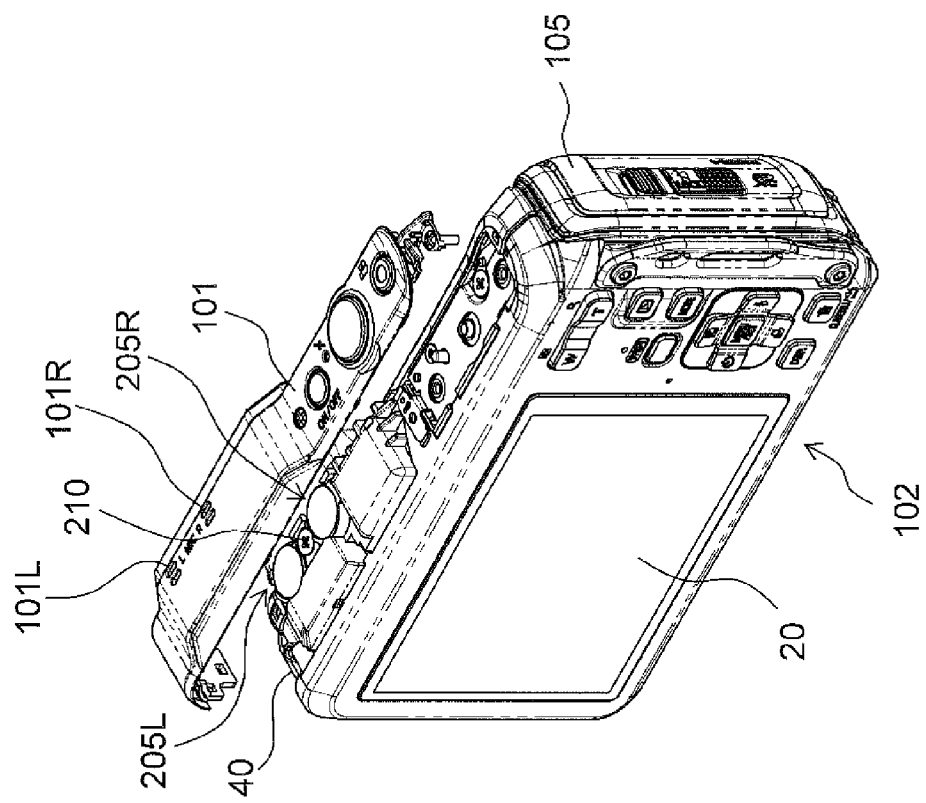
FIG. 3C is an exploded oblique view of the upper part of the digital camera pertaining to this embodiment.

FIG. 1 is an oblique view of the digital camera 100 pertaining to this embodiment as seen from the front. FIG. 2 is an oblique view of the digital camera 100 pertaining to this embodiment as seen from the rear. FIG. 3A is an exploded oblique view of the rear face of the digital camera 100 pertaining to this embodiment. FIG. 3B is an exploded oblique view of the front face of the digital camera 100 pertaining to this embodiment. FIG. 3C is an exploded oblique view of the upper part of the digital camera 100 pertaining to this embodiment.

The digital camera 100 has the functions of executing the capture, recording, and reproduction of still pictures. The digital camera 100 is also an electronic device capable of recording and reproducing audio. More specifically, the digital camera 100 has the functions of executing the capture, recording, and reproduction of moving pictures accompanied by audio.

With the digital camera 100, when a still picture or moving picture is captured, light incident from the subject is converted into an image, and this image is recorded.

As shown in FIGS. 1, 2, 3A, 3B, and 3C, the digital camera 100 has a chassis 40, a top frame 101, a rear case unit 207, a rear frame 102, a front frame 103, a side frame 104, a battery lid 105, and an optical system 10.

Various mechanisms, a control board, and so forth for operating the digital camera 100 are disposed in the chassis 40. Also, the optical system 10, the top frame 101, the rear case unit 207, the rear frame 102, the front frame 103, the side frame 104, the battery lid 105, and the optical system 10 are mounted in chassis 40. The battery lid 105 is mounted on the chassis 40 so that it can be opened and closed.

Control buttons 101a are disposed on the top frame 101. First microphone through-holes 101L and 101R are formed in the top frame 101.

Control buttons 207a, a monitor 20, and a speaker (not shown) are mounted on the rear case unit 207. The monitor 20 displays recorded images, for example.

The rear frame 102 is mounted to the rear face of the chassis 40 so as to cover the rear case unit 207. Button openings 102a for disposing the control buttons 207a, and a monitor frame 102b for disposing the monitor 20 are formed in the rear frame 102.

An optical frame 103a for guiding light from the subject to the optical system is formed in the front frame 103. The front frame 103 is mounted on the front face of the chassis 40.

Light from the subject is incident on the optical system 10. The optical system 10 is mounted inside the chassis 40.

Here, a water-tight internal space is formed on the inside of the front frame 103 of the digital camera 100. More precisely, the water-tight internal space is constituted by the chassis 40 and the rear case unit 207. A sound wave pickup 30 that includes microphones 203L and 203R is housed in the water-tight internal space.

<Configuration of Sound Wave Pickup>

Figure 4:
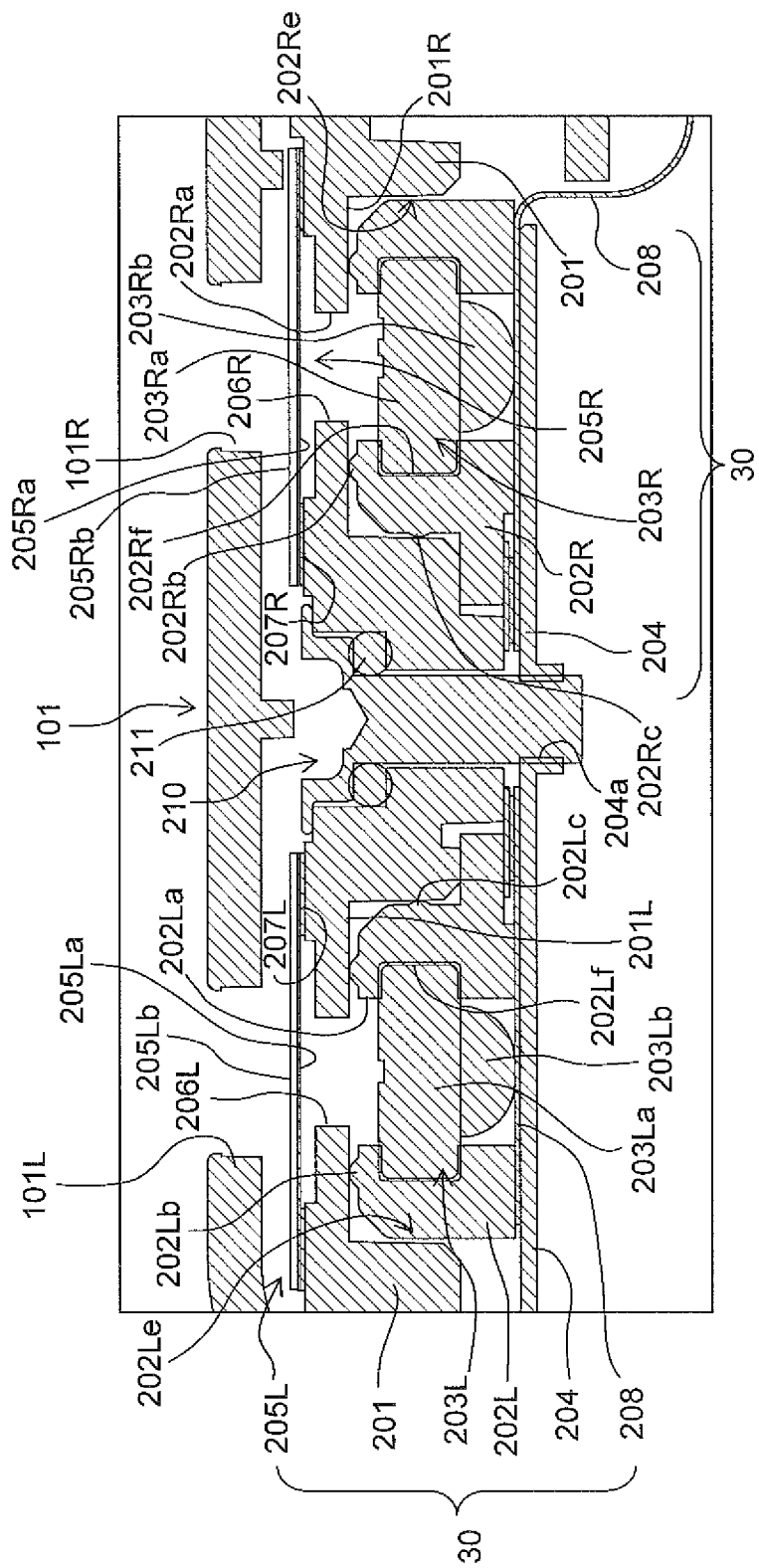
FIG. 4 is a cross section of the sound wave pickup pertaining to this embodiment.
Figure 5:
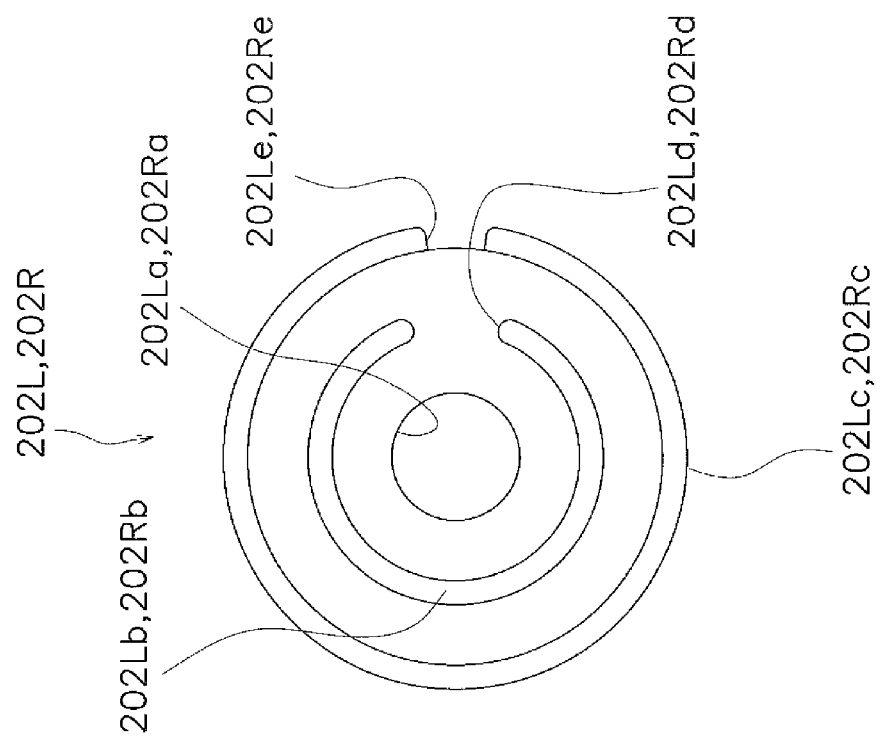
FIG. 5 is a top view of a microphone damper pertaining to this embodiment.

FIG. 4 is a cross section of the sound wave pickup of the digital camera 100 pertaining to this embodiment. FIG. 4 is a cross section along the A-A line in FIGS. 1 and 2. FIG. 5 is a top view of microphone dampers 202L and 202R.

As shown in FIG. 4, the sound wave pickup 30 is disposed inside (lower part) the top frame 101 of the digital camera 100. The sound wave pickup 30 (an example of a waterproof microphone device) is formed integrally with the chassis 40. The sound wave pickup 30 has a microphone housing portion 201 (an example of a housing), the microphone dampers 202L and 202R (an example of attenuation member), microphones 203L and 203R (an example of microphone), a plate 204, microphone sheets 205L and 205R (an example of air-impermeable cover member), and a flexible printed substrate 208.

The microphone housing portion 201 is formed integrally with the chassis 40. The microphone housing portion 201 is made up of a left microphone housing portion 201L and a right microphone housing portion 201R. Second microphone through-holes 206L and 206R are formed in the microphone housing portions 201L and 201R.

The microphone dampers 202L and 202R are used to attenuate noise during operation of the internal mechanisms of the digital camera 100. The microphone dampers 202L and 202R are also used to allow sound waves to properly reach the microphones 203L and 203R.

The microphone dampers 202L and 202R are disposed on the outside of the microphones 203L and 203R. Specifically, the microphone dampers 202L and 202R are formed in a cylindrical shape. More specifically, as shown in FIGS. 4 and 5, the microphone dampers 202L and 202R have third microphone through-holes 202La and 202Ra, first ribs 202Lb and 202Rb (an example of noise insulator), second ribs 202Lc and 202Rc (an example of noise insulator), and concave components 202Lf and 202Rf. The first ribs 202Lb and 202Rb are formed in an arc shape on the upper faces of the microphone dampers 202L and 202R. The second ribs 202Lc and 202Rc are formed in an arc shape on the outer peripheral face of the microphone dampers 202L and 202R.

As shown in FIG. 5, channels 202Ld and 202Rd are formed at both ends of the first ribs 202Lb and 202Rb. Similarly, channels 202Le and 202Re are formed at both ends of the second ribs 202Lc and 202Rc. The channels 202Ld, 202Rd, 202Le, and 202Re are used to adjust the air pressure of the sealed space above the microphone dampers 202L and 202R. This sealed space is formed by the microphone sheets 205L and 205R, the microphone dampers 202L and 202R, and the microphones 203L and 203R. The function of the channels 202Ld, 202Rd, 202Le, and 202Re is to gradually return this sealed space to atmospheric pressure in the event that the air pressure in the sealed space should fluctuate.

The concave components 202Lf and 202Rf are formed in an annular shape in the peripheral direction at the inner peripheral part of the microphone dampers 202L and 202R. The microphone dampers 202L and 202R engage with the microphones 203L and 203R.

The use of these microphone dampers 202L and 202R allows the order in which the microphones 203L and 203R and the microphone sheets 205L and 205R are attached to be determined as desired. An example will be given here in which the microphone sheets 205L and 205R are mounted on the microphone housing portions 201L and 201R, after which the microphones 203L and 203R are incorporated into the microphone housing portions 201L and 201R. However, the microphone sheets 205L and 205R may be mounted on the microphone housing portions 201L and 201R after the microphones 203L and 203R have been incorporated into the microphone housing portions 201L and 201R, for example.

The microphones 203L and 203R are devices that pick up external sound waves. When the microphones 203L and 203R pick up an external sound wave, they output an audio signal. The audio signal is subjected to various kinds of processing at a digital audio processor (not shown). For example, the digital audio processor subjects the audio signal to directivity synthesis processing.

The directivity synthesis processing will now be described. An sound wave coming from the right of the digital camera 100 first reaches the microphone 203R on the right side, and then reaches the microphone 203L on the left side after a specific delay time. Therefore, the audio output of the microphone 203R on the right side is delayed by the delay time, and this result is subtracted from the audio output of the microphone 203L, which cancels out the output with respect to sound waves coming from the right. Meanwhile, sound waves coming from the left of the digital camera 100 are processed in the same way as the sound waves coming from the right of the digital camera 100, which also cancels out the audio output with respect to sound waves coming from the left of the digital camera 100. In this way, sound waves (stereo effect) are produced that arrive at the digital camera 100 from the left and right.

The microphones 203L and 203R have microphone components 203La and 203Ra and connectors 203Lb and 203Rb. The microphone components 203La and 203Ra are formed in a cylindrical shape. The outer peripheral part of the microphone components 203La and 203Ra mates with the concave components 202Lf and 202Rf of the microphone dampers 202L and 202R. The microphone components 203La and 203Ra are soldered to the flexible printed substrate 208 at the connectors 203Lb and 203Rb. Also, the two microphones 203L and 203R are disposed close together. More specifically, the two microphones 203L and 203R are disposed in a state of being close together by spaced a specific distance apart.

The plate 204 is used to hold the microphone dampers 202L and 202R and the microphones 203L and 203R. The plate 204 has a female threaded hole 204a. The plate 204 is fixed to the chassis 40 by threading a threaded member 210 into the female threaded hole 204a. A sealing member is disposed between the head of the threaded member 210 and the upper part of the female threaded hole 204a.

The microphone sheets 205L and 205R are able to vibrate and have a waterproofing function. The microphone sheets 205L and 205R are made of an air-impermeable material. The microphone sheets 205L and 205R are fixed on the outside of the microphone housing portions 201L and 201R by adhesives 207L and 207R.

The microphone sheets 205L and 205R have first sheets 205La and 205Ra and second sheets 205Lb and 205Rb. The first sheets 205La and 205Ra are elastic members. More precisely, the first sheets 205La and 205Ra are members that are elastic and weather resistant. Also, the first sheets 205La and 205Ra are formed from a material that is less stiff than the second sheets 205Lb and 205Rb. For example, the first sheets 205La and 205Ra are formed from silicone rubber.

The first sheets 205La and 205Ra are disposed on the microphones 203L and 203R side. In other words, the first sheets 205La and 205Ra are disposed between the microphones 203L and 203R and the second sheets 205Lb and 205Rb. A sealed space is formed between the first sheets 205La and 205Ra and the microphones 203L and 203R.

The second sheets 205Lb and 205Rb are laminated to the first sheets 205La and 205Ra. The second sheets 205Lb and 205Rb are elastic members. More precisely, the second sheets 205Lb and 205Rb are members that are elastic and weather resistant. Also, the second sheets 205Lb and 205Rb are formed from a material that is stiffer than the first sheets 205La and 205Ra. For example, the second sheets 205Lb and 205Rb are formed from polyethylene terephthalate.

The second sheets 205Lb and 205Rb are disposed on the opposite side from the microphones 203L and 203R. More specifically, the second sheets 205Lb and 205Rb are disposed on the top frame 101 side.

<Sound Wave Pickup Assembly Method>

With the sound wave pickup 30, first the microphone sheets 205L and 205R are mounted to the upper face of the microphone housing portions 201L and 201R so as to block off the second microphone through-holes 206L and 206R. Then, the microphones 203L and 203R are mounted to the microphone dampers 202L and 202R. More precisely, the microphones 203L and 203R are mated with the concave components 202Lf and 202Rf of the microphone dampers 202L and 202R.

Then, the microphones 203L and 203R mounted to the microphone dampers 202L and 202R are mounted to the microphone housing portions 201L and 201R. In this state, the first ribs 202Lb and 202Rb and the second ribs 202Lc and 202Rc of the microphone dampers 202L and 202R are in contact with the microphone housing portions 201L and 201R. In this way, the microphones 203L and 203R and the microphone dampers 202L and 202R are mounted to the microphone housing portions 201L and 201R.

Finally, the plate 204 is fixed to the chassis 40. More specifically, first a sealing member 211 is disposed in a threaded hole formed in the chassis 40. Then, the threaded member 210 is inserted from outside the chassis 40 into a threaded hole formed in the chassis 40. The male threads of the threaded member 210 mesh with the female threaded hole 204a in the plate 204. This fixes the plate 204 to the chassis 40 via the threaded member 210.

When the sound wave pickup 30 is assembled in this way, the microphone dampers 202L and 202R are sandwiched between the plate 204 and the microphone housing portions 201L and 201R. In this state, the microphones 203L and 203R are supported by only the microphone dampers 202L and 202R.

Finally, once the layout of the sound wave pickup is complete, the microphone sheets 205L and 205R, the adhesives 207L and 207R, the second microphone through-holes 206L and 206R, the third microphone through-holes 202La and 202Ra (the upper parts of the microphone dampers 202L and 202R), the microphones 203L and 203R, the lower parts of the microphone dampers 202L and 202R, the flexible printed substrate 208, and the plate 204 are disposed in that order starting from the outside of the sound wave pickup 30.

Sound Wave Pickup Method

With this digital camera 100, external sound waves are propagated by the first microphone through-holes 101L and 101R of the top frame 101, whereupon they reach the sound wave pickup 30, that is, the microphone sheets 205L and 205R. Since the microphone sheets 205L and 205R here are impermeable, external sound waves vibrate the microphone sheets 205L and 205R without passing through the microphone sheets 205L and 205R. This vibration of the microphone sheets 205L and 205R generates sound waves. These sound waves then passes through the second microphone through-holes 206L and 206R and the third microphone through-holes 202La and 202Ra, and are picked by the microphones 203L and 203R.

The first ribs 202Lb and 202Rb and the second ribs 202Lc and 202Rc are formed in the microphone dampers 202L and 202R so that sound waves from the outside (sound waves generated by vibration of the microphone sheets 205L and 205R) will reach the microphones 203L and 203R with as little loss as possible. When the first ribs 202Lb and 202Rb and the second ribs 202Lc and 202Rc hit the microphone housing portion 201, this brings the microphone dampers 202L and 202R into closer contact with the microphone housing portion 201. Also, the fit between the microphone dampers 202L and 202R and the microphone housing portions 201L and 201R is made snugger by fixing the plate 204 to the microphone housing portion 201 with the threaded member 210.

<Conclusion>

(1) In the sound wave pickup 30, since the microphone sheets 205L and 205R are air-impermeable, external sound waves don't pass through the microphone sheets 205L and 205R, and only sound waves produced by vibration of the microphone sheets 205L and 205R are picked up by the microphones 203L and 203R. Thus, with the sound wave pickup 30, since the microphone sheets 205L and 205R are air-impermeable, external sound waves do not directly reach the microphones 203L and 203R. Specifically, with the sound wave pickup 30, sound waves produced by the vibration of the microphone sheets 205L and 205R are picked up as external sound waves by the microphones 203L and 203R. Thus, with the sound wave pickup 30, there is no interference between sound waves passed through the microphone sheets 205L and 205R and sound waves produced by vibration of the microphone sheets 205L and 205R, so a stereo effect can be reproduced well.

Also, with the sound wave pickup 30, since the microphones 203L and 203R are individually housed in the microphone housing portions 201L and 201R, a stereo effect can be reproduced better than when a plurality of microphones are housed together in a single space inside a microphone housing portion.

When a plurality of microphones are housed together in a microphone housing portion (single chamber housing), with a permeable microphone sheet, external sound waves passed through the microphone sheet and sound waves produced by vibration of the microphone sheet are picked up by a plurality of microphones. The external sound wave passed through the microphone sheet here has the properties of stereo sound, and the sound wave produced by vibration of the microphone sheet substantially has the properties of monaural sound. That is, the sound wave picked up by the microphones is a mixture of stereo sound and monaural sound, making it difficult to extract just the stereo sound from the sound waves picked up by the microphones.

Also, even though a plurality of microphones are housed individually in microphone housing portions, if permeable microphone sheets are used, the sound waves picked up by the microphones will end up being a mixture of stereo sound and monaural sound, just as with single chamber housing. Therefore, here again, it is difficult to extract just the stereo sound from the sound waves picked up by the microphones.

However, with the sound wave pickup 30, the microphone sheets 205L and 205R are air-impermeable, and the microphones 203L and 203R are individually housed in the microphone housing portions 201L and 201R, so the microphones 203L and 203R can pick up just the stereo sound well.

(2) The sound wave pickup 30 comprises the microphone dampers 202L and 202R. The microphone dampers 202L and 202R are used to attenuate noise and vibration. The microphone dampers 202L and 202R are disposed between the microphone housing portions 201L and 201R and the microphones 203L and 203R. Thus disposing the microphone dampers 202L and 202R between the microphone housing portions 201L and 201R and the microphones 203L and 203R allows for good attenuation of noise and/or vibration of the internal mechanisms of the digital camera 100, and of vibration received by the digital camera 100 from the outside and/or noise produced when this vibration is received.

(3) With the sound wave pickup 30, the microphone dampers 202L and 202R have the first ribs 202Lb and 202Rb and the second ribs 202Lc and 202Rc. These first ribs 202Lb and 202Rb and second ribs 202Lc and 202Rc can block out noise propagated between the microphone dampers 202L and 202R and the microphone housing portions 201L and 201R. Specifically, noise from the internal mechanisms of the digital camera 100 and noise produced when the digital camera 100 receives vibration from the outside can be blocked out well.

(4) With the sound wave pickup 30, the channels 202Ld and 202Rd and the channels 202Le and 202Re that are used for venting air between the microphones 203L and 203R and the microphone sheets 205L and 205R are formed in the first ribs 202Lb and 202Rb and the second ribs 202Lc and 202Rc. If, for example, the microphones 203L and 203R are mounted in the microphone housing portions 201L and 201R in which the microphone sheets 205L and 205R are mounted, there is the risk that the microphone sheets 205L and 205R will be expanded by air present between the microphone sheets 205L and 205R and the microphones 203L and 203R. If this happens, the microphones 203L and 203R may not be able to pick up external sound wave well. With the sound wave pickup 30, in contrast, since the above-mentioned channels 202Ld, 202Rd, 202Le, and 202Re are formed in the first ribs 202Lb and 202Rb and the second ribs 202Lc and 202Rc, these channels 202Ld, 202Rd, 202Le, and 202Re allow the air to escape, so the microphone sheets 205L and 205R can be disposed in the proper positions.

(5) With the sound wave pickup 30, the plurality of microphone dampers 202L and 202R are sandwiched by the plate 204 and the microphone housing portion 201. For example, the plurality of microphones 203L and 203R and the plurality of microphone dampers 202L and 202R are disposed in the microphone housing portions 201L and 201R, and the plate 204 is mounted to the microphone dampers 202L and 202R in a state of being in contact with the plurality of microphone dampers 202L and 202R. Consequently, vibration inputted to the plate 204 can be favorably attenuated by the microphone dampers 202L and 202R. Also, even though the sound wave pickup 30 is made up of a plurality of members, the sound wave pickup 30 can be easily assembled by using the plate 204.

(6) With the sound wave pickup 30, the microphones 203L and 203R are housed in the microphone housing portions 201L and 201R, respectively. Consequently, with the sound wave pickup 30, a stereo effect can be obtained more favorably than when the microphones 203L and 203R are housed in a single microphone housing portion 201.

(7) With the sound wave pickup 30, the microphone sheets 205L and 205R have a first sheet formed from silicone rubber, and a second sheet formed from polyethylene terephthalate and laminated to the first sheet. Thus, the microphone sheets 205L and 205R are made from an air-impermeable material.

On the other hand, ordinary microphone sheets are permeable to air. Permeable microphone sheets are known to have lower pressure resistance than the air-impermeable microphone sheets 205L and 205R. Therefore, when a permeable microphone sheet is used, the higher the water pressure, the smaller the surface area of the microphone sheet has to be. If the surface area of a microphone sheet is reduced, the microphones 203L and 203R may not be able to properly pick up sound wave produced by vibration of the microphone sheet.

In contrast, with the sound wave pickup 30, the microphone sheets 205L and 205R are made from an air-impermeable material, so if the goal is to ensure the same pressure resistance as with a permeable microphone sheet, the surface area of the microphone sheets 205L and 205R can be increased. Specifically, with the sound wave pickup 30, good pressure resistance can be ensured while sound wave can be picked up properly.

<Other Embodiments>

The present technology is not limited to or by the above embodiment, and various other embodiments are possible. Other embodiments of the present technology will be given below.

(A) In the above embodiment, an example was given in which the microphones 203L and 203R were incorporated into the microphone housing portions 201L and 201R after the microphone sheets 205L and 205R were mounted on the microphone housing portions 201L and 201R. Instead of this, the microphone sheets 205L and 205R may be incorporated into the microphone housing portions 201L and 201R after the microphones 203L and 203R have been mounted on the microphone housing portions 201L and 201R. Here again, the same effect as above can be obtained.

Figure 6:
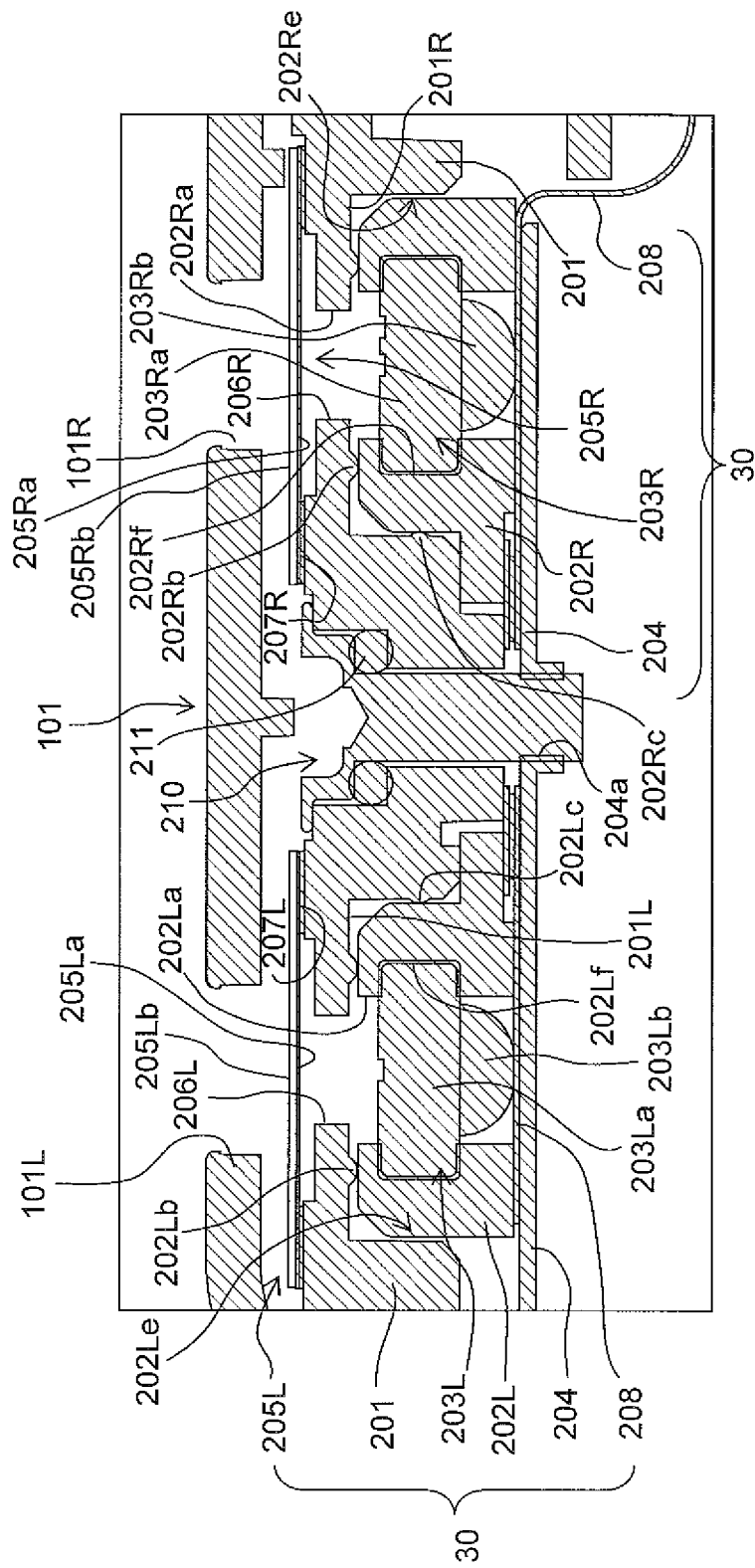
FIG. 6 is a cross section of the microphone damper pertaining to another embodiment.

(B) In the above embodiment, an example was given in which the microphone dampers 202L and 202R had the first ribs 202Lb and 202Rb and the second ribs 202Lc and 202Rc. Instead of this, as shown in FIG. 6, the first ribs 202Lb and 202Rb and the second ribs 202Lc and 202Rc may be formed on the microphone housing portion 201. Also, either the first ribs 202Lb and 202Rb or the second ribs 202Lc and 202Rc may be formed on the microphone dampers 202L and 202R, and the other of the first ribs 202Lb and 202Rb and the second ribs 202Lc and 202Rc formed on the microphone housing portion 201. Here again, the same effect as above can be obtained. In FIG. 6, those components that are the same as in the above embodiment are numbered the same.

(C) In the above embodiment, an example was given in which the two microphones 203L and 203R were used, but the number of microphones 203L and 203R is not limited to that in the above embodiment, and may instead be three or more.

(D) In the above embodiment, an example was given in which the first sheets 205La and 205Ra were formed from silicone rubber, but the first sheets 205La and 205Ra may be made from any material so long as it is elastic and has weather resistance. For example, the first sheets 205La and 205Ra may be formed from EPDM (ethylene-propylene-diene rubber) or the like.

(E) In the above embodiment, an example was given in which the second sheets 205Lb and 205Rb were formed from polyethylene terephthalate, but the second sheets 205Lb and 205Rb may be made from any material so long as it is elastic and has weather resistance. For example, the second sheets 205Lb and 205Rb may be formed from PBT (polybutylene terephthalate) or the like.

Figure 7:
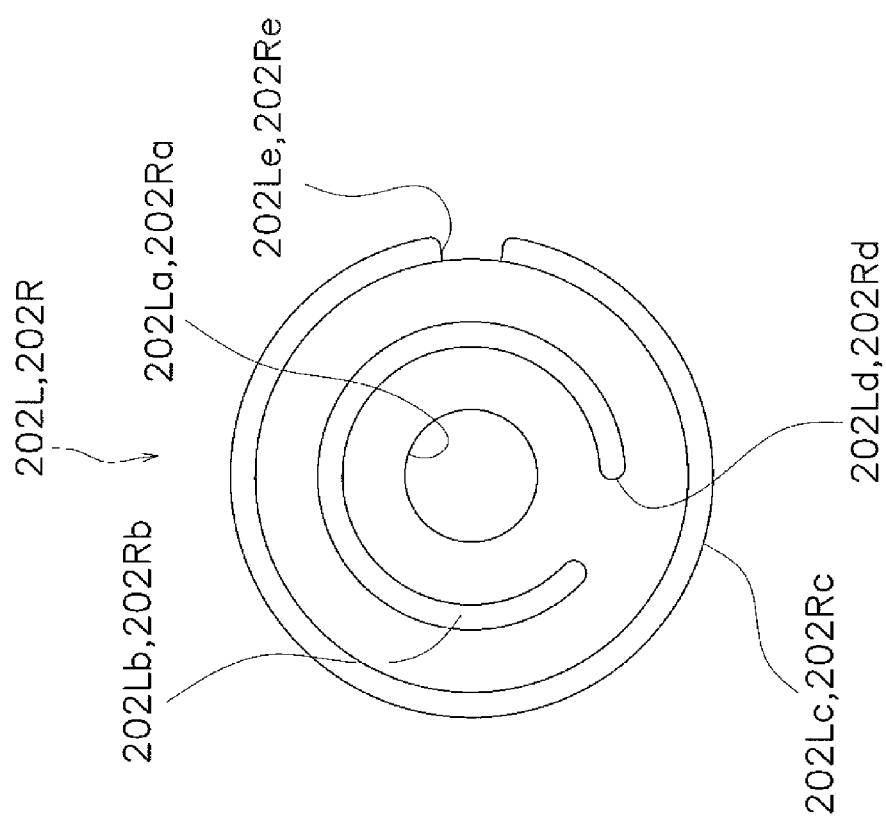
FIG. 7 is a top face view of the microphone damper pertaining to another embodiment.

(F) In the above embodiment, an example was given in which the channels 202Ld and 202Rd of the first ribs 202Lb and 202Rb and the channels 202Le and 202Re of the second ribs 202Lc and 202Rc were formed in the same phase as seen from the outside (above) in FIG. 5, but the channels 202Ld, 202Rd, 202Le, and 202Re do not necessarily have to be in the same phase. For example, as shown in FIG. 7, the channels 202Ld and 202Rd of the first ribs 202Lb and 202Rb may have a different phase from that of the channels 202Le and 202Re of the second ribs 202Lc and 202Rc. In FIG. 7, those components that are the same as in the above embodiment are numbered the same.

(G) In the above embodiment, an example was given in which the sound wave pickup 30 (an example of a waterproof microphone device) was applied to the digital camera 100, but this sound wave pickup 30 can be applied to any device so long as it comprises a microphone device.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the waterproof microphone device. Accordingly, these terms, as utilized to describe the present technology should be interpreted relative to the waterproof microphone device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

Industrial Applicability

This disclosure can be broadly applied to waterproof microphone devices.

What is claimed is:

1. A waterproof microphone device, comprising:
   a plurality of microphone housing portions housing a plurality of microphones, respectively, each of the plurality of microphone housing portions including a through-hole and an impermeable cover member covering the through-hole to define a space within the each of the plurality of microphone housing portions;
   a plurality of cylindrically shaped microphone dampers each disposed in one of the plurality of microphone housing portions and surrounding the respective microphone; and
   a plurality of rib portions each disposed between one of the dampers and an inner surface of the respective microphone housing portion with respect to a radial direction of an axis of the through-hole of the respective microphone housing portion, wherein for each of the plurality of rib portions, one of the dampers is disposed on both sides of the rib portion with respect to a radial direction of the axis of the through-hole of the respective microphone housing portion or one of the dampers is disposed on both sides of the rib portion with respect to a parallel direction of the axis of the through-hole of the respective microphone housing portion, the plurality of rib portions configured to adjust an air pressure of the space within each of the plurality of microphone housing portions.

2. The waterproof microphone device according to claim 1, wherein
   the plurality of rib portions include an arc shape first rib portion having a first channel and an arc shape second rib portion having a second channel.

3. The waterproof microphone device according to claim 2, wherein
   the first channel has a same phase of the second channel or a different phase from the second channel.

4. A waterproof microphone device, comprising:
   a first microphone including a first sound-picking face through which a sound wave is picked up;
   a second microphone including a second sound-picking face through which the sound wave is picked up, the second sound-picking face arranged to face in the same direction as the first sound-picking face;

a first housing portion disposed on an outer side of the first microphone so as to house the first microphone, the first housing portion including a first through-hole arranged to face the first sound-picking face;

a second housing portion disposed on an outer side of the second microphone so as to house the second microphone, the second housing portion including a second through-hole arranged to face the second sound-picking face;

a first air-impermeable cover member mounted on the first housing portion so as to cover the first through-hole and to define a space within the first housing portion;

a second air-impermeable cover member mounted on the second housing portion so as to cover the second through-hole and to define a space within the second housing portion, the second air-impermeable cover member being separate and spaced from the first air-impermeable cover member;

a first cylindrically shaped microphone damper disposed in the first housing portion and surrounding the first microphone;

a second cylindrically shaped microphone damper disposed in second housing portion and surrounding the second microphone;

a first rib portion disposed between the first cylindrically shaped microphone damper and an inner surface of the first housing portion with respect to a radial direction of an axis of the first through-hole, the first cylindrically shaped microphone damper disposed on both sides of the first rib portion with respect to a radial direction of the axis of the first through-hole or the first cylindrically shaped microphone damper disposed on both sides of the first rib portion with respect to a parallel direction of the axis of the first through-hole, the first rib portion configured to adjust an air pressure of the space within the first housing portion; and a second rib portion disposed between the second cylindrically shaped microphone damper and an inner surface of the second housing portion with respect to a radial direction of an axis of the second through-hole, the second cylindrically shaped microphone damper disposed on both sides of the second rib portion with respect to a radial direction of the axis of the second through-hole or the second cylindrically shaped microphone damper disposed on both sides of the second rib portion with respect to a parallel direction of the axis of the second through-hole, the second rib portion configured to adjust an air pressure of the space within the second housing portion.

5. The waterproof microphone device according to claim 4, wherein
each of the first and second air-impermeable cover member is a laminated sheet layer, each of the first and second air-impermeable cover member includes a first sheet and a second sheet, and a stiffness of the second sheet is higher than a stiffness of the first sheet.

6. The waterproof microphone device according to claim 5, wherein
the first sheet is disposed so as to face each of the first sound-picking face and the second sound-picking face, and the second sheet is disposed on a side of the first sheet opposite to each of the first sound-picking face and the second sound-picking face.

7. The waterproof microphone device according to claim 5, wherein
the first sheet is formed from silicone rubber, and the second sheet is disposed and is formed from polyethylene terephthalate.

8. The waterproof microphone device according to claim 4, wherein
a channel is formed in each of the first and second rib portions to release air in each of the spaces within the first and second housing portions, respectively.

9. The waterproof microphone device according to claim 4, further comprising:
a fixing member mounted on a housing having the first housing portion and the second housing portion, each of the first and second cylindrically shaped microphone damper held between the fixing member and each of the first and second housing portions.

10. The waterproof microphone device according to claim 4, further comprising:
a third rib portion disposed between the first cylindrically shaped microphone damper and an inner surface of the first housing portion, the third rib portion configured to adjust an air pressure of the space within the first housing portion; and a fourth rib portion disposed between the second cylindrically shaped microphone damper and an inner surface of the second housing portion, the fourth rib portion configured to adjust an air pressure of the space within the second housing portion, wherein the first rib portion has an arc shape and has a first channel, the second rib portion has an arc shape and has a second channel, the third rib portion has an arc shape and has a third channel, and the fourth rib portion has an arc shape and has a fourth channel.

11. The waterproof microphone device according to claim 10, wherein
the first channel has a same phase of the third channel or a different phase from the third channel, and the second channel has a same phase of the fourth channel or a different phase from the fourth channel.

* * * * *